United States Patent
Timonen (10) Patent No.: US 9,505,331 B2
(45) Date of Patent: Nov. 29, 2016

(54) AUTOMOTIVE VEHICLE CONTAINER HANDLING SYSTEM

(71) Applicant: GM Global Technology Operations LLC, Detroit, MI (US)

(72) Inventor: Jussi A. Timonen, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 702 days.

(21) Appl. No.: 13/757,235

(22) Filed: Feb. 1, 2013

(65) Prior Publication Data
US 2014/0219754 A1    Aug. 7, 2014

(51) Int. Cl.
*B60P 1/64*    (2006.01)
(52) U.S. Cl.
CPC .................... *B60P 1/6436* (2013.01)
(58) Field of Classification Search
CPC ........................ B60P 1/6436; B60P 1/6427
USPC ............................................. 414/469
See application file for complete search history.

(56) References Cited

U.S. PATENT DOCUMENTS

| | | | | |
|---|---|---|---|---|
| RE20,760 E | * | 6/1938 | Ludington | B60P 1/6436 414/470 |
| 2,304,116 A | * | 12/1942 | Fitch | B60P 1/6436 414/499 |
| 2,926,797 A | * | 3/1960 | Decker | B60P 1/6436 414/347 |
| 3,074,570 A | * | 1/1963 | Venziani | B60P 1/50 414/541 |
| 4,153,169 A | * | 5/1979 | Cipkowski | B65G 63/004 414/434 |
| 4,470,747 A | * | 9/1984 | Tichenor | B65F 3/001 298/13 |
| 5,639,207 A | | 6/1997 | Green | |
| 8,043,043 B2 | * | 10/2011 | Collins | B60P 1/6454 414/469 |
| 2011/0318148 A1 | * | 12/2011 | Obermeyer | B60P 1/6463 414/469 |

FOREIGN PATENT DOCUMENTS

| | | |
|---|---|---|
| CN | 2511536 Y | 9/2002 |
| CN | 2587709 Y | 11/2003 |
| DE | 2903462 A1 | 8/1980 |
| DE | 8129692 U1 | 2/1982 |
| GB | 1146269 A | 3/1969 |
| WO | 03093055 A1 | 11/2003 |

OTHER PUBLICATIONS

Chinese Office Action dated Nov. 3, 2015 ; Application No. 201410085222,8 ; Applicant: GM Global Technology Operations LLC.; 9 Pages.

* cited by examiner

*Primary Examiner* — Jonathan Snelting
(74) *Attorney, Agent, or Firm* — BrooksGroup (57) ABSTRACT

A number of variations may include a container handling system for an automotive vehicle having a generally horizontal cargo bed area including a container for holding cargo. The container may have an alignment surface. A power unit for imparting vertical and horizontal movement to the container may also be provided. The power unit may be connected on the vehicle. A latching mechanism connecting the power unit with the container may be provided. A guide structure connected on the vehicle may guide vertical and horizontal movement of the container by interacting with the container alignment surface.

21 Claims, 8 Drawing Sheets

AUTOMOTIVE VEHICLE CONTAINER HANDLING SYSTEM

TECHNICAL FIELD

The field to which the disclosure generally relates to includes apparatus and methods of utilization thereof of container handling systems for automotive vehicles.

BACKGROUND

A major cost of transporting goods is generated by the labor and time required to load cargo into vehicles and unload cargo from vehicles. The above noted costs are increased wherein the cargo amount is less than a full load.

SUMMARY OF ILLUSTRATIVE VARIATIONS OF THE INVENTION

A number of variations of the invention may include a container handling system for an automotive vehicle having a generally horizontal cargo bed area including a container for holding cargo. The container may have an alignment surface. A power unit for imparting vertical and horizontal movement to the container may be provided. The power unit may be connected on the vehicle. A latching mechanism connecting the power unit with the container may be provided. A guide structure connected on the vehicle may guide vertical and horizontal movement of the container by interacting with the container alignment surface.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
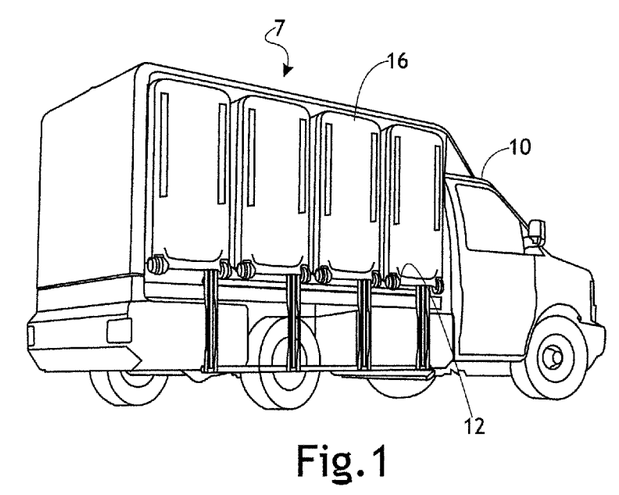
FIG. 1 is a perspective view of a vehicle handling system used in an environment of a van type automotive vehicle according to a number of variations of the invention.
Figure 2:
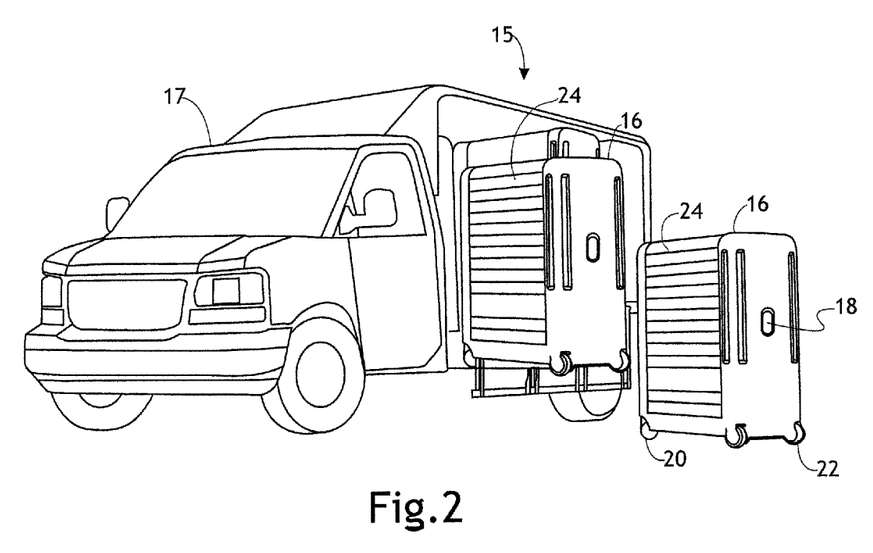
FIG. 2 is a perspective view similar to that of FIG. 1 showing an alternative container handling system for an automotive vehicle wherein the containers are generally larger than the containers shown in FIG. 1.

A number of variations of the invention are illustrated by FIG. 1 and may include a container handling system 7 for an automotive vehicle. The automotive vehicle 10 may have a generally horizontal cargo bed area 12. The container handling system 7 typically may have a plurality of container structures or containers 16 for holding cargo. FIG. 2 is a view of a container handling system 15 generally similar to the containing handling system 7 previously described. The container handling system 15 is provided for a van or light truck vehicle 17. The container handling system 15 may have a plurality of containers 16. The containers 16 may be fabricated from a metal or from a suitable plastic material or a combination of such materials. The containers 16 may have a locking feature 18. The container 16 also may have front wheels 20 having pivotal casters and rear wheels 22. The container 16 may optionally have sliding doors 24 to allow access for the loading or removal of associated cargo. The containers 16 may have a horizontal length generally equal to the cargo bed of the vehicle 17 or may optionally be a half of the transverse length of the cargo bed provided for the vehicle 17.

Figure 3:
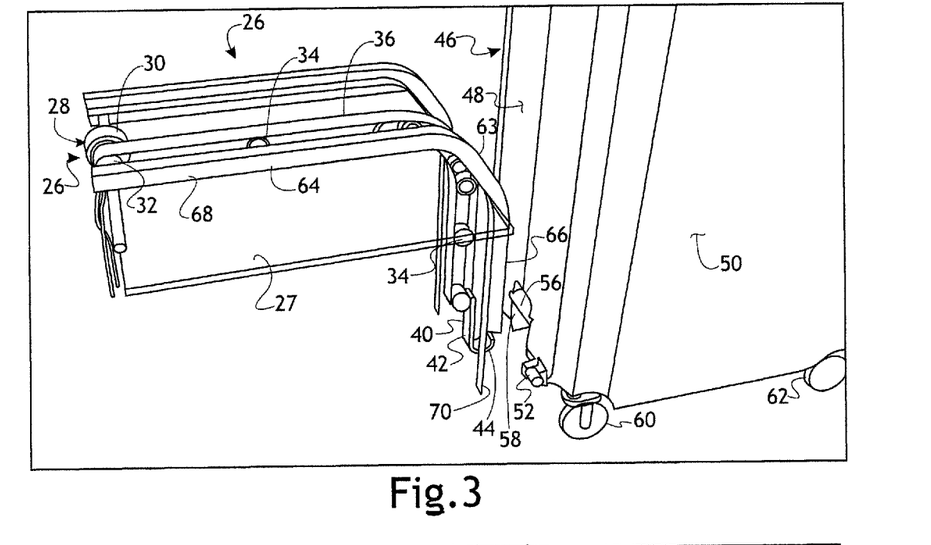
FIG. 3 is a partial enlarged perspective view of a container handling system for automotive vehicle that may be utilized as the container handling systems shown in FIGS. 1 and 2.
Figure 4:
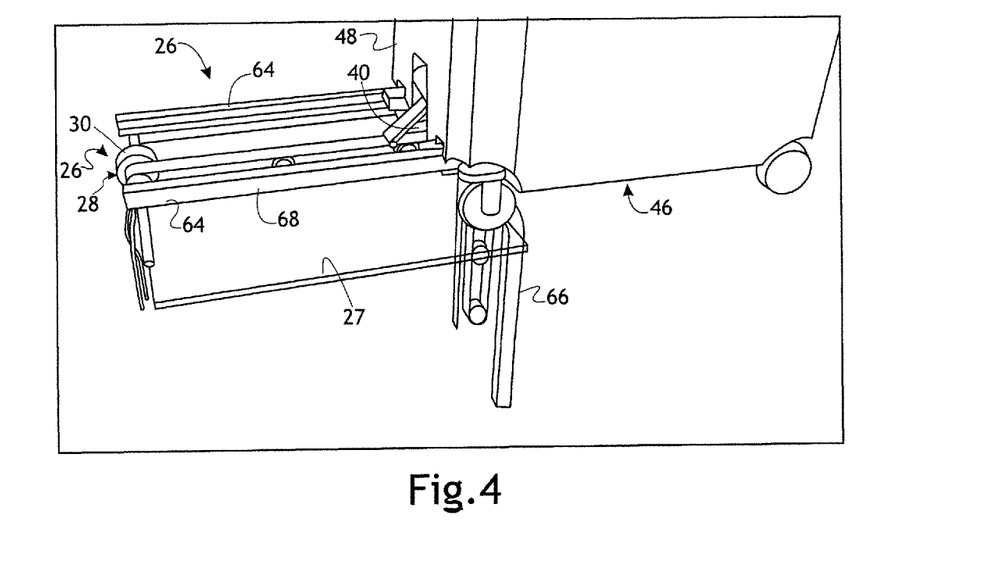
FIG. 4 is a perspective operational view of the container handling system shown in FIG. 3 according to a number of variations of the invention.

Referring to FIGS. 3 and 4, a container handling system 26 may have a generally horizontal cargo bed area 27. A power unit 28 may be provided for imparting vertical and horizontal movement to a container 46. The power unit 28 may be connected with the vehicle. The power unit 28 may include an electric motor 30 which powers a drive pulley 32. The power unit 28 also may have a series of slave pulleys 34. Mounted on the pulleys 34 may be a flexible torsional force member provided by a belt 36. The belt 36 may form a continuous loop. In other variations, not shown, the power unit may be provided by a chain which is engaged by a plurality of sprockets. A hook and shackle latching mechanism may be provided for connecting the power unit 28 with the container 46. As shown the latching mechanism may include a hook 40 which has a shank 42 pivotally connected with the belt 36 and having a head 44.

The container 46 may have a front 48 and lateral sides 50. The container 46 also has a shackle 56 for selective latching engagement with the head 44 of the hook. A container 48 also may have out board extending alignment surfaces provided by laterally spaced apart rollers 52. The container 46 also may have a longitudinal tunnel 58 extending underneath to allow clearance for the power unit 28, which extends underneath the container 46, when the container is positioned on the cargo bed 27. To allow the container 48 to be rolled over to be aligned with the power unit 28 connected with the truck, the container may have rear wheels 62 and front wheels 60 which are connected by a pivotal castor.

A guide structure for guiding vertical and horizontal movement of the container 46 by interacting with the container alignment surface (rollers 52) may be provided by laterally spaced apart rails 64 that are juxtapose by the power unit 28. The rails 64 may be connected with the vehicle. As shown best in FIG. 4, the rails 64 may extend underneath the container 48 when the container is positioned upon the generally horizontal cargo bed 27. Rails 64 may have a transition area 63 between generally horizontal 66 and vertical 68 sections of the rails 64. Each rail 64 may engage with a separate perspective roller 52 of the container.

In operation the container 46 may be wheeled into an aligned position with the power unit 28 adjacent the side of the vehicle cargo bed. The container 46 was previously loaded with appropriate cargo. The power unit 28 may move the hook 40 to engaged with the shackle 56 either by a directive of a vehicle or loading operator, or it may be done automatically by a circuit which senses contacts of the rollers 52 with a lower section 70 of the rails 64. The power unit may move the hook 40 to the left of the position shown in FIG. 4 placing the container 46 on the cargo bed 27. If desired, engagement of the hook 40 with the shackle 56 may also be utilized to hold the container 46 on the cargo bed during vehicle travel. To dismount the container 46 from the cargo bed 27 the power unit 28 may be simply reversed. The engagement of the rollers 52 with the rail 64 may ensure a proper orientation of the container 46 both in its vertical and horizontal movement.

Figure 5:
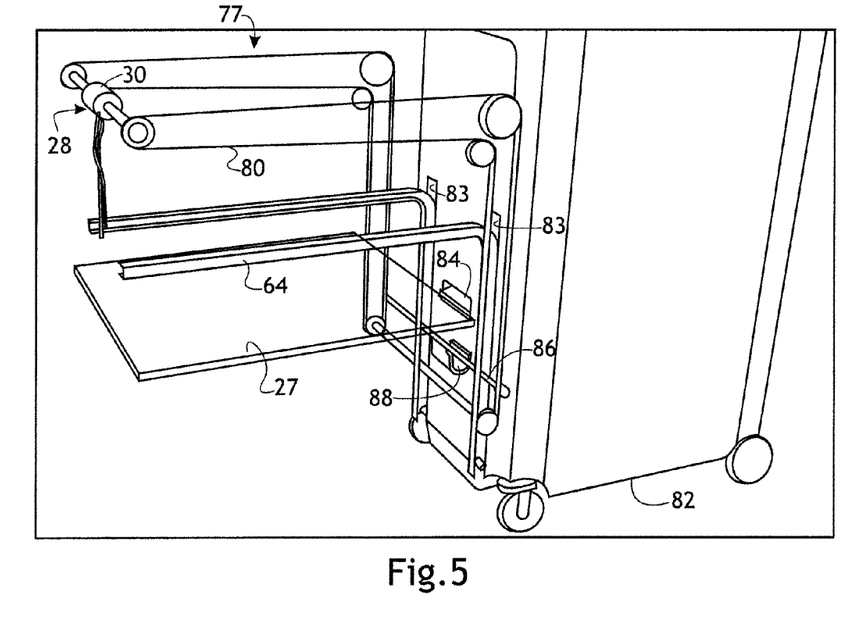
FIG. 5 is an alternate container handling system to that shown in FIG. 3 according to a number of variations of the invention.
Figure 6:
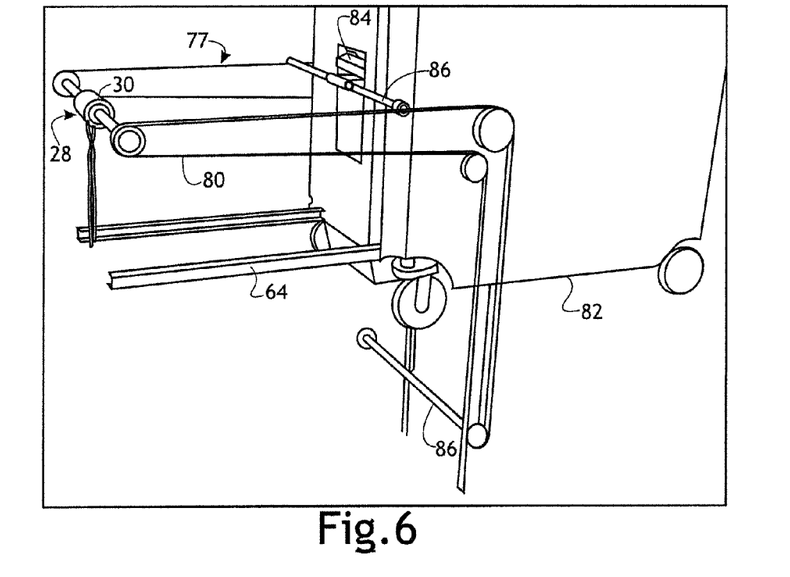
FIG. 6 is a perspective operational view of the container handling system shown in FIG. 5.

Referring to FIGS. 5 and 6, an alternate variation container handling system 77 may be provided. Container handling system 77 may be similar to previously described container handling system 26 in that it may have two guide rails 64 which extend underneath a container 82 (when the container 82 is positioned on the cargo bed 27). Container 82 may be substantially similar to container 46 previously described with the exception that its shackle 84 may be at a generally higher elevation. Shackle 84 may be generally at a middle of the transverse width of the container 82 in a manner similar to the previously described shackle 56. Also the container 82 on a front surface may have a series of parallel spaced grooves 83 which also aid in the guiding function by engagement with the rails 64 during the vertical movement of the container. Container handling system 77 also may have a power unit with laterally spaced apart dual belts 80. The belts 80 may be juxtapose by the container 82 when the container 82 is positioned upon the cargo bed 27. The belts 80 may be cross connected by a generally transverse crossbar 86 which connects with a hook 88 which engages the shackle 84. With this container handling system 77 the horizontal moving of the container 82 and the horizontal guiding of the container by the lower rails 64 may be at substantially different vehicle elevations that enhance stability.

Figure 7:
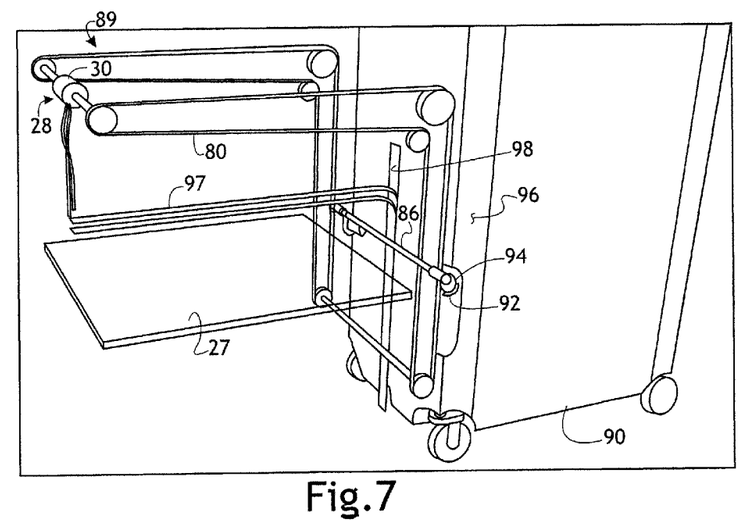
FIG. 7 is an alternate container handling system to that shown in FIG. 5 according to a number of variations of the invention.
Figure 8:
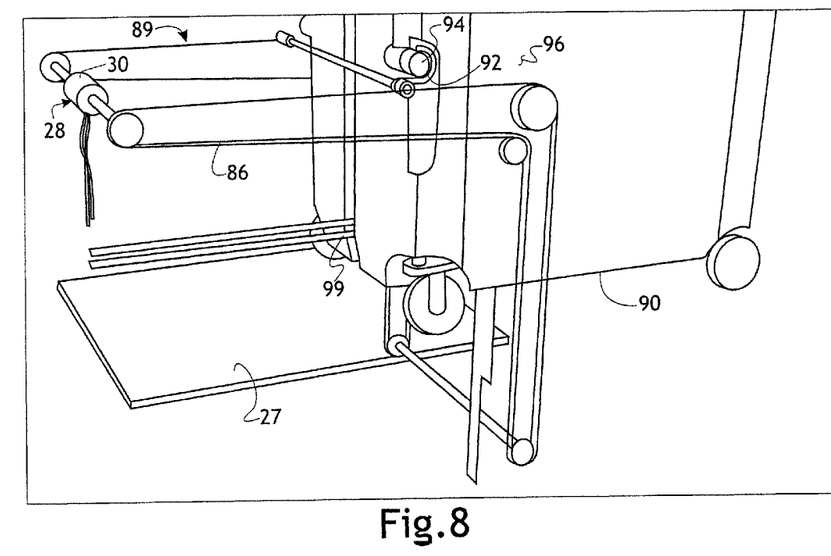
FIG. 8 is a perspective operational view of the container handling system shown in FIG. 7.

Referring to FIGS. 7 and 8, a container handling system 89 may be provided which is substantially similar to previously described container handling system 77. Container handling system 89 may have dual spaced apart belts 80 as previously described. However the crossbar 86 may be connected with laterally spaced apart hooks 92. Hooks 92 may engage with shackles 94 of the container 90. Shackles 94 of container 90 may be positioned generally adjacent the container side surfaces 96. Container 90 also may have a generally centered width frontal groove 98 that engages initially with a centrally spaced rail 97. As best seen in FIG. 8, the container 90 also may have a roller 99 that gets captured within the rail 97.

Figure 9:
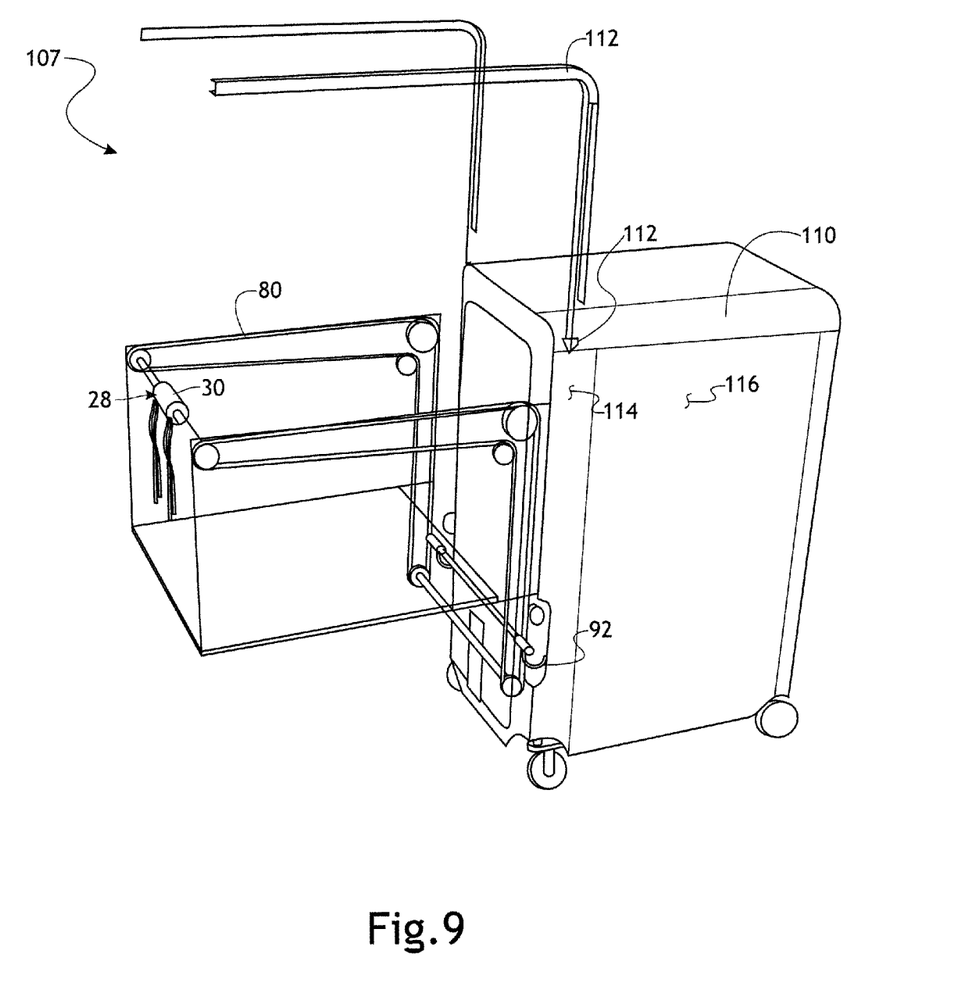
FIG. 9 is an alternate container handling system to that shown in FIG. 7 according to a number of variations of the invention.
Figure 10:
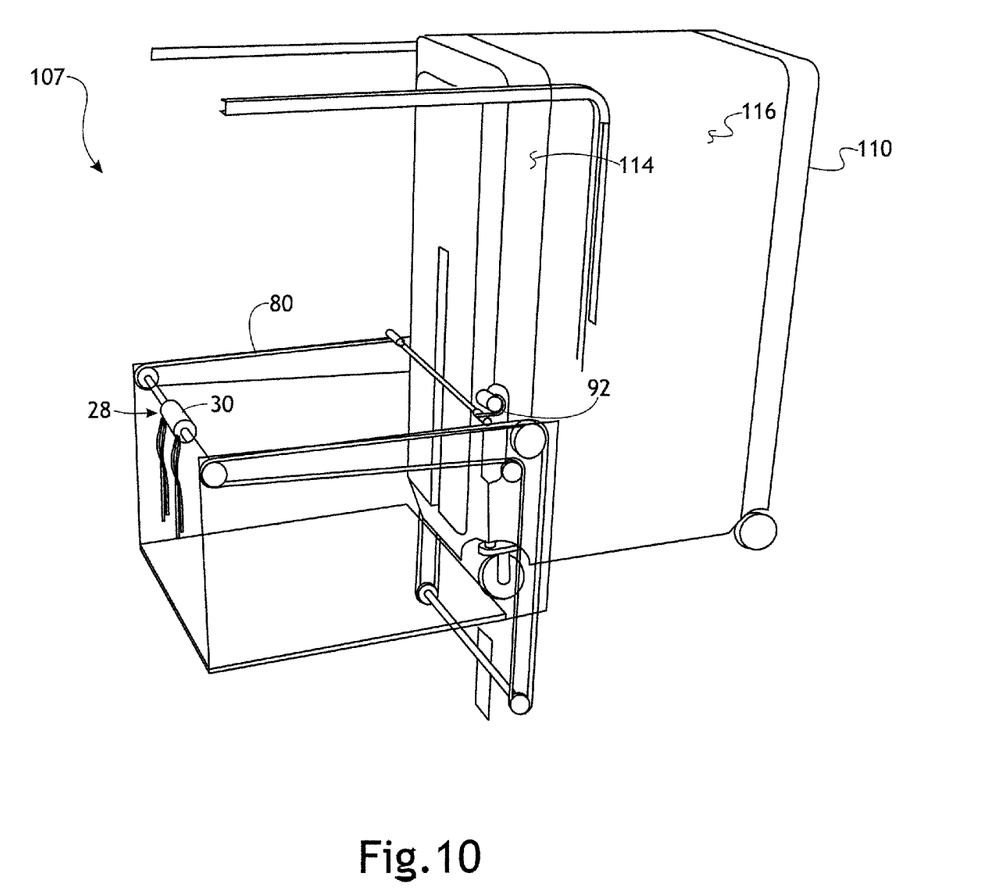
FIG. 10 is a perspective operational view of the container handling system shown in FIG. 9.
Figure 11:
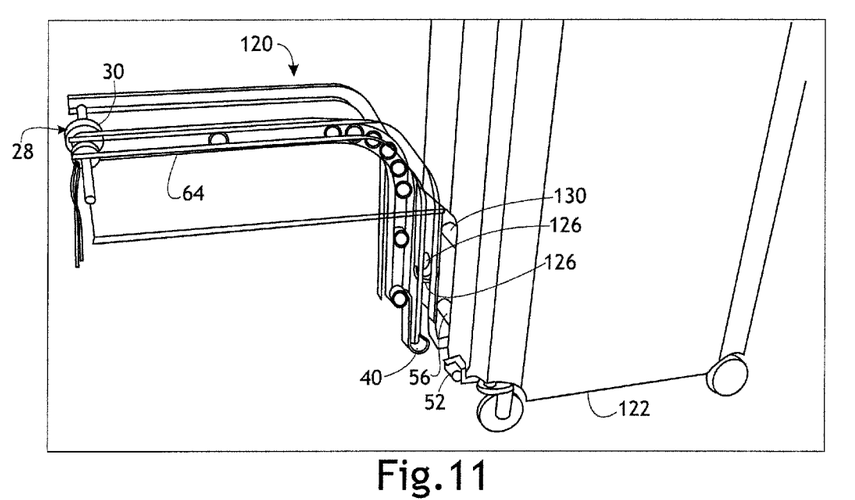
FIG. 11 is an alternate container handling system to that shown in FIG. 9 according to a number of variations of the invention.

Referring to FIGS. 9 and 10, a container handling system 107 may be provided which is substantially similar to container handling system 89 previously described. The container handling system 107 may have dual spaced apart belts 80 having dual hooks 92. A container 110 may have alignment rollers 52 which may be positioned generally adjacent the front half 114 and top half 116 of the container for alignment with an elevated dual spaced apart rails 112. The substantial elevational difference of the alignment rails 112 with respect to the hooks 92 may give enhanced stability.

Figure 12:
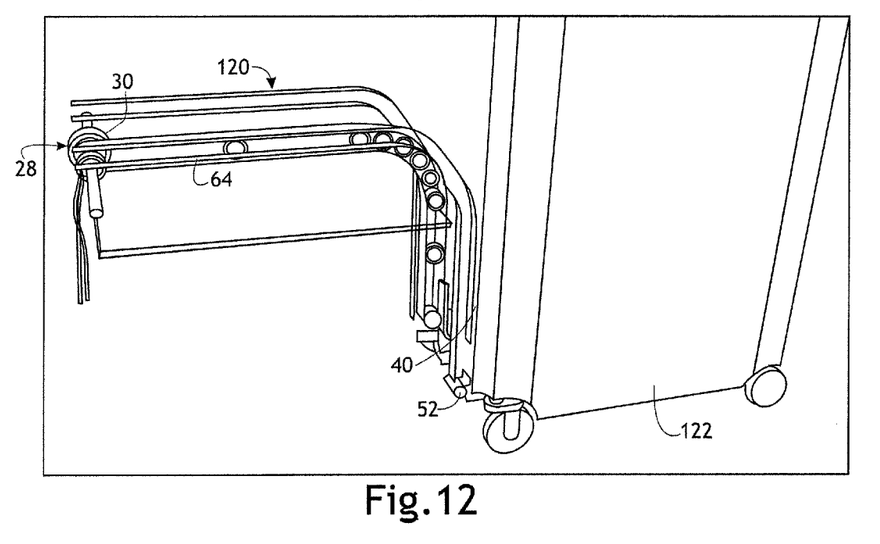
FIG. 12 is a perspective operational view of the container handling system shown in FIG. 11.
Figure 13:
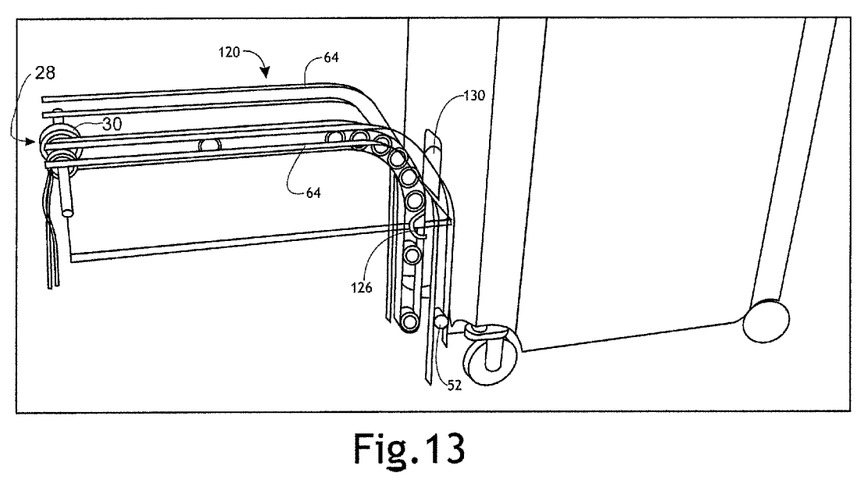
FIG. 13 is a perspective operational view of the container handling system shown in FIG. 11.
Figure 14:
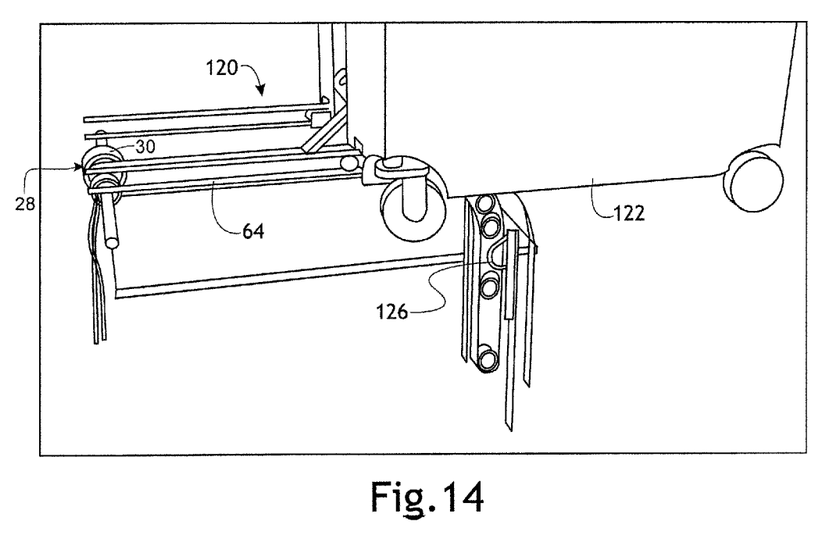
FIG. 14 is a perspective operational view of the container handling system shown in FIG. 11.

Referring to FIGS. 11 through 14 an alternate variation container handling system 120 may be provided having multiple (for example three hooks). The container handling system 120 may have a hook 40 as generally described for container handling system 26. A container 122 may have a lower shackle 56 for engagement with the lower hook 40. The container 122 also may have an upper shackle 130 for engagement with auxiliary hooks 126 which are higher then hook 40. Hooks 126 also may be laterally spaced from hook 40. As best shown in FIG. 12 upon initial movement of hook 40 vertically upwards and before alignment rollers 52 engage with rails 64, hook 40 engages with shackle 56 and hooks 126 engage upon the initial upward movement of the container 122 with shackle 130. Upon further upward movement placing the alignment rollers 52 with in the rails 64, the hooks 126 disengage from the shackle 130 as best shown in FIG. 13. Upon further horizontal movement the hooks 126 are totally disengaged and only hook 40 may be utilize in a manner as previously described for container handling system 26. Container handling system 120 by utilization of the three hooks gives increased ability to the container 122 upon its initial vertical lift.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other that as expressly described herein and still are considered to be within the scope of the invention.

Variation 1 of the invention may include a container handling system for an automotive vehicle having a generally horizontal cargo bed area including; a container structure for holding cargo, the container structure having an alignment surface; a power unit for imparting vertical and horizontal movement to the container structure, the power unit being connected on the vehicle; a latching mechanism for connecting the power unit with the container structure; and a guide structure connected on the vehicle for guiding vertical and horizontal movement of the container structure by interacting with the container structure alignment surface.

Variation 2 of the invention may include a container handling system as set forth in Variation 1 wherein the alignment surface is provided by a roller.

Variation 3 of the invention may include a container handling system as set forth in any of Variations 1-2 wherein the alignment surface is generally adjacent an upper half and a front half of the container structure.

Variation 4 of the invention may include a container handling system as set forth in any of Variations 1-3 wherein the power unit includes a motor powering a flexible torsional force member and the latching mechanism includes a hook connected with the flexible torsional force member and a shackle connected with the container structure and wherein the container structure is wheeled.

Variation 5 of the invention may include a container handling system as set forth in any of Variations 1-4 wherein the flexible torsional force member is a continuous loop belt.

Variation 6 of the invention may include a container handling system as set forth in any of Variations 1-5 wherein the guide structure includes a rail and the rail and the power unit extend underneath the container structure when the container structure is on the cargo bed.

Variation 7 of the invention may include a container handling system as set forth in any of Variations 1-6 wherein there are two rails juxtaposed by the power unit, each rail engaging with a separate alignment surface of the container structure.

Variation 8 of the invention may include a container handling system as set forth in any of Variations 1-7 wherein the powered unit has dual laterally spaced apart flexible torsional force members juxtapose by the container structure when the container structure is positioned on the cargo bed.

Variation 9 of the invention may include a container handling system as set forth in any of Variations 1-8 wherein there are two rails, each rail engaging with a separate alignment surface of the container structure.

Variation 10 of the invention may include a container handling system as set forth in any of Variations 1-9 wherein there is a single rail underneath the container structure adjacent a middle with a the container structure when the container structure is positioned on the cargo bed.

Variation 11 may include a container handling system as set forth in any of Variations 1-10 wherein there are two laterally spaced hooks and wherein the container structure has shackles generally adjacent side surfaces of the container structure.

Variation 12 of the invention may include a container handling system as set forth in any of Variations 1-11 wherein the laterally spaced flexible torsional force members are connected by a crossbar.

Variation 13 of the invention may include a container handling system as set forth in any of Variations 1-12 wherein the guide structure is provided by a rail underneath the container structure and lower than the flexible torsional force member when the container structure is positioned on the cargo bed.

Variation 14 of the invention may include a container handling system as set forth in any of Variations 1-13 wherein the power unit has a first lower hook and two laterally spaced upper hooks and wherein the upper hooks release upon horizontal movement of the container structure.

Variation 15 of the invention may include a container handling system as set forth in any of Variations 1-14 wherein a wheeled container structure for holding cargo is provided, the container structure having a shackle and laterally spaced alignment rollers, the rollers being at a different elevation of the container structure than the shackle; and a pulley driven continuous loop belt with a pivotally connected hook is provided for engagement with the shackle, the belt imparting vertical and horizontal movement to the container structure, the pulley driven belt being connected on the vehicle; and laterally spaced apart rails are connected on the vehicle for guiding vertical and horizontal movement of the container structure by interacting with the alignment rollers.

Variation 16 of the invention may include a method of handling cargo for transport by a vehicle having a generally horizontal cargo bed comprising: providing a wheeled container structure having a shackle and an alignment surface; loading cargo in the container structure; moving the container structure adjacent the vehicle cargo bed; moving the container structure vertically upwards and horizontally onto the cargo bed with a powered flexible torsional force member having a connected hook that is latched with the shackle; and providing a guide structure connected with the vehicle, and guiding vertical and horizontal movement of the container structure by the guide structure interacting with the alignment surface.

Variation 17 of the invention may include a method as set forth in Variation 16 wherein the guiding of the container structure is at a different elevation then the engagement of the hook with the shackle.

Variation 18 of the invention may include a method as set forth in any of the Variations 16-17 wherein the container structure is moved by two laterally spaced apart hooks.

Variation 19 of the invention may include a method as set forth in any of the Variations 16-18 wherein the container structure is initially moved vertically upward by multiple hooks and is moved horizontally by only one hook.

Variation 20 of the invention may include a method as set forth in any of the Variations 16-19 wherein the container structure is guided by laterally spaced apart rails.

The above description of select examples of the invention is merely exemplary in nature and, thus, variations or variants thereof are not to be regarded as a departure from the spirit and scope of the invention.

What is claimed is:

1. A product comprising:
   container handling system for an automotive vehicle having a generally horizontal cargo bed area comprising:
   a container structure for holding cargo, said container structure having an alignment surface, and the container structure having a first wheel having a pivotal caster connected to the container structure;
   a power unit for imparting vertical and horizontal movement to said container structure, said power unit being connected on said vehicle;
   a latching mechanism for connecting said power unit with said container structure; and
   a guide structure connected on said vehicle for guiding vertical and horizontal movement of said container structure by interacting with said container structure alignment surface, wherein the guide structure includes a horizontal section of rail and a vertical section of rail.

2. A product as described in claim 1 wherein said alignment surface is provided by at least one out board extending roller.

3. A product as described in claim 1 wherein said power unit includes a motor powering a flexible torsional force member and said latching mechanism includes a hook connected with said flexible torsional force member and a shackle connected with said container structure and wherein said container structure is wheeled.

4. A product as described in claim 1 wherein said power unit includes a motor powering a flexible torsional force member comprising a continuous loop belt.

5. A product as described in claim 1 wherein the guide structure includes a rail and said rail and said power unit extend underneath said container structure when said container structure is on the cargo bed.

6. A product as described in claim 1 wherein there are two rails juxtaposed by said power unit, each rail engaging with a separate alignment surface of said container structure.

7. A product as set forth in claim 1 wherein the guide structure further comprises a transition section of rail between the horizontal section of rail and the vertical section of rail.

8. A product as set forth in claim 7 wherein the transition section of rail is curved.

9. A product as set forth in claim 1 wherein said alignment surface is provided by a pair of out board extending rollers.

10. A product as set forth in claim 1 wherein the container structure includes a second wheel having a pivotal caster connected to the container structure.

11. A product as set forth in claim 1 wherein the first wheel is a front wheel, and further comprising a rear wheel having a pivotal caster connected to the container structure.

12. A product as set forth in claim 1 wherein the container structure comprises sliding doors to allow access for the loading or removal of associated cargo.

13. A product as set forth in claim 1 wherein the container structure has a horizontal length equal to the cargo bed of the vehicle.

14. A product as set forth in claim 1 wherein the container structure has a horizontal length equal a half of the transverse length of the cargo bed provided for the vehicle.

15. A product for an automotive vehicle having a generally horizontal cargo bed area comprising:
- a wheeled container structure for holding cargo, said container structure having a shackle and laterally spaced alignment rollers, said rollers being at a different elevation of said container structure than said shackle, wherein wheeled container structure comprises a first wheel having a pivotal caster connected to the wheeled container structure;
- a pulley driven continuous loop belt with a pivotally connected hook for engagement with said shackle, said belt imparting vertical movement and horizontal movement to said container structure, said pulley driven belt being connected on said vehicle; and
- laterally spaced apart rails connected on said vehicle for guiding vertical movement and for guiding horizontal movement of said container structure by interacting with said alignment rollers.

16. A method as set forth in claim 15 wherein the rails include a horizontal section of rail and a vertical section of rail.

17. A product as set forth in claim 16 wherein the rails further comprise a transition section of rail between the horizontal section of rail and the vertical section of rail.

18. A product as set forth in claim 17 wherein the transition section of rail is curved.

19. A product as set forth in claim 15 wherein said alignment surface is provided by a pair of out board extending rollers.

20. A product as set forth in claim 15 wherein the container structure includes a second wheel having a pivotal caster connected to the container structure.

21. A product as set forth in claim 20 wherein the first wheel is a front wheel, and further comprising a rear wheel having a pivotal caster connected to the container structure.

\* \* \* \* \*